US007484237B2

(12) United States Patent
Joly et al.

(10) Patent No.: US 7,484,237 B2
(45) Date of Patent: Jan. 27, 2009

(54) METHOD AND APPARATUS FOR ROLE-BASED SECURITY POLICY MANAGEMENT

(75) Inventors: Pascal Joly, Roseville, CA (US); Olivier Berger, Onex (CH); Joe Reves, Colorado Springs, CO (US); Jean-Laurent Huynh, Mountain View, CA (US); Suresh Pai, Alpharetta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 812 days.

(21) Appl. No.: 10/844,342

(22) Filed: May 13, 2004

(65) Prior Publication Data

US 2005/0257244 A1    Nov. 17, 2005

(51) Int. Cl.
*G06F 21/00*    (2006.01)
(52) U.S. Cl. .......................................... 726/1; 713/153
(58) Field of Classification Search ..................... 726/1; 713/153
See application file for complete search history.

(56) References Cited

U.S. PATENT DOCUMENTS 6,738,908 B1 *   5/2004   Bonn et al. .................... 726/4

2001/0049793 A1 *   12/2001   Sugimoto .................... 713/200
2003/0065942 A1 *   4/2003   Lineman et al. ............. 713/201

\* cited by examiner

*Primary Examiner*—Gilberto Barron, Jr.
*Assistant Examiner*—Virgil Herring

(57) ABSTRACT

A method and corresponding tool are described for security policy management in a network comprising a plurality of hosts and at least one configurable policy enforcement point. The method, comprises creating one or more policy templates representing classes of usage control models within the network that are enforceable by configuration of the policy enforcement points; creating one or more policy instances, each based on one of the templates and instantiating the template for identified sets of hosts within the network to which the usage control model is to be applied, deploying the policy instances by generating and providing one or more configuration files for provisioning corresponding policy enforcement points within the network. Access to the templates and policy instances is controlled so that the policy templates are only modifiable by a first predeterminable user group, the policy instances are only modifiable by the first or a second predeterminable user group and the policy instances are only deployable by a third predeterminable user group.

14 Claims, 4 Drawing Sheets

METHOD AND APPARATUS FOR ROLE-BASED SECURITY POLICY MANAGEMENT

FIELD OF THE INVENTION

The invention relates in general to computer networks, and more particularly, to a method and apparatus for managing security policies for users and computers in a network.

BACKGROUND OF THE INVENTION

In modern computing environments, the management of the information infrastructure and assets of a company is a complex and expensive task. In order to address security risks, enterprises will commonly define an IT governance model, ie rules to be applied to usage of their computing infrastructure in order to protect company information and assets. Such rules might be for instance "company employees may not have FTP access to external FTP servers unless specifically authorised to do so", for instance. Based on these high-level policy objectives, a more detailed set of technical specifications will need to be defined and deployed to give effect to the policy. These specifications will address the configuration of computing devices such as servers, databases, routers or firewalls. It is these latter specific technical specifications that will be referred to in the following as "security policies".

Deploying and managing such security policies within a large enterprise infrastructure is a very complex task. Any implementation errors or uncontrolled modification of the security policies could put the enterprise electronic assets at risk. Therefore, numerous checks and approvals are typically required before any change in the security policies can be effective. This situation has to be balanced against the need for speed and responsiveness to business needs. As a result, deploying and managing security policies in a large and distributed enterprise is both time-consuming and resource intensive.

Several issues make the creation and management of these security policies difficult. First, creating the security policies is a labour-intensive process requiring significant skill. Second, selecting an appropriate set of detailed controls for each type of computing platform to enforce the security policy so that it is aligned with the IT governance model requires even more detailed analysis by someone that understands that particular type of system. Once selected, these controls may need to be broken down into a set of manual steps that must be performed most of the time locally by a system administrator responsible for the platforms being protected.

A variety of measures have already been proposed to deal with these difficulties. For instance, systems are known that enable to electronically create a security policy document, which contains appropriate controls required to enforce the security policy on various computing platforms. For instance USP 2003/0065942 describes software that creates a direct link between the security policy documents that are created and distributed to people and the control files sent to computers on the network.

A policy server product is available from Solsoft Inc that enables a security policy to be designed and applied on a virtual network.

The present applicant's U.S. patent application 2002/0099823 describes a method of creating a structured access list template for use in deploying a network security policy in a large partitioned network.

However, most approaches to security policy management are in practice project-oriented: that is each new implementation or deployment even if it may be partially or even wholly automated, and its relationship to the IT governance model, is considered individually. It is therefore not always convenient to leverage from previous implementations, and it can be time-consuming to evaluate the risks associated with proposed changes within the enterprise.

Moreover, the role of the person who has the job of deciding what is permitted through any particular policy boundary is very often tied to a physical location: the network subnet, or the place in the topology where the boundary physically exists. This can make the deployment of policies in a large and geographically distributed enterprise resource intensive and inefficient.

An object of this invention is to mitigate the above drawbacks associated with known approaches.

SUMMARY OF THE INVENTION

In brief, to achieve this, the invention provides a method for security policy management in a network comprising a plurality of hosts and at least one configurable policy enforcement point, comprising;
creating one or more policy templates representing classes of usage control models within the network that are enforceable by configuration of the policy enforcement points;
creating one or more policy instances, each based on one of the templates and instantiating the template for identified sets of hosts within the network to which the usage control model is to be applied,
deploying the policy instances by generating and providing one or more configuration files for provisioning corresponding policy enforcement points within the network;
controlling access to the templates and policy instances so that the policy templates are only modifiable by a first predeterminable user group, the policy instances are only modifiable by the first or a second predeterminable user group and the policy instances are only deployable by a third predeterminable user group.

In preferred embodiments, the policy instances can only be created by the first predeterminable group.

The usage control models can correspond, for instance to sets of capabilities that will be possible for, or limitations to be applied to, predeterminable groups of hosts.

The invention finds particular advantage if the network is a large partitioned network and, in this case, at least some of the policy enforcement points can be filters present in the network, such as firewalls, routers, switches, or specific network appliances. The policy deployment is typically configured as an ACL on a router interface.

The technique described above is based on two observations. First it has been recognized that in the organisational arrangement surrounding most IT infrastructures the people defining the security policies and the people responsible for their technical application can be, and usually are, different groups of people. Thus, although role-based policy management is known as such, for instance from US2003/0229623, in the scheme described above a distinct role is defined having a limited set of access privileges to the security policies being deployed, but that includes identifying policy enforcement points.

Thus, the first predeterminable user group is intended to comprise the individuals that have the necessary technical skill and overall knowledge of the design of the computing system and the high level security policy objectives set by the enterprise, as well as the risks faced in order to correct specify the usage control models that are enforceable by configuration of the policy enforcement points within the system.

The second predeterminable user group is intended to comprise the individuals that are aware of the business or technical needs for specific usage control models within the system. The usage models managed might, for instance, correspond to a network partition to which a business partner has access and the capabilities that business partner has within this network partition. Similarly, the usage model might correspond to a site or geography within the enterprise and define the capabilities that employees accessing the network from within that site or geography. Alternatively, the usage model may be intended for a specific services infrastructure in the system such as a DNS or DHCP infrastructure.

The third predeterminable user group are the people who have the detailed knowledge of the addresses and parameters of the policy enforcement points to enable then to deploy the policies directly without having to make any kind of risk assessment, nor requiring overall knowledge of the design of the system. One advantage of the approach is that potentially a single individual may deploy a template instance irrespective of where either that individual or the policy enforcement points concerned are located. The only thing that these locations have in common is that they are part of the same Policy Instance. The ability to map these policy enforcement points into a single individual's control—through the role-based authorization model—is an important advantage. A further advantage is that the redeployment of modified templates may be automated.

Another aspect of the invention provides a tool for security policy management in a network comprising a plurality of hosts and at least one configurable policy enforcement point, the tool comprising; a policy creation environment for enabling a first predeterminable user group to create one or more policy templates representing classes of usage control models within the network that are enforceable by configuration of the policy enforcement points and one or more policy instances, each based on one of the templates and instantiating the template for identified sets of hosts within the network to which the usage control model is to be applied, and for enabling a second predeterminable user group to modify the policy instances; and a deployment mechanism for enabling a third predeterminable user group to deploy the policy instances by generating and providing one or more configuration files for provisioning corresponding policy enforcement points within the network; and an access control mechanism for controlling access to the templates and policy instances so that the policy templates are only modifiable by the first predeterminable user group, the policy instances are only modifiable by the second predeterminable user group and the policy instances are only deployable by the third predeterminable user group.

In preferred embodiments, the access control mechanism can be arranged so that access to the templates is controlled such that policy instances can only be created by the first predeterminable group.

The deployment mechanism can deploy at least some of the policy instances by generating access control lists for configuration on router interfaces.

In particularly preferred embodiments, a mechanism can be provided for, in response to a change to one or more of the policy templates, automatically triggering the creation of one or more corresponding modified policy instances, and the deployment of the modified policy instances by generating and providing one or more modified configuration files for provisioning corresponding policy enforcement points within the network.

BRIEF DESCRIPTION OF THE DRAWINGS

An embodiment of the invention will now be described with reference to the accompanying drawings, wherein.

DESCRIPTION OF AN EMBODIMENT OF THE INVENTION

In the following an implementation of the invention within a partitioned network having an architecture of the type described in US2001/0042213 and US2002/0099823, the contents of which are herein incorporated by reference, and which will be referred to herein as a Network Bubble Architecture.

Figure 1:
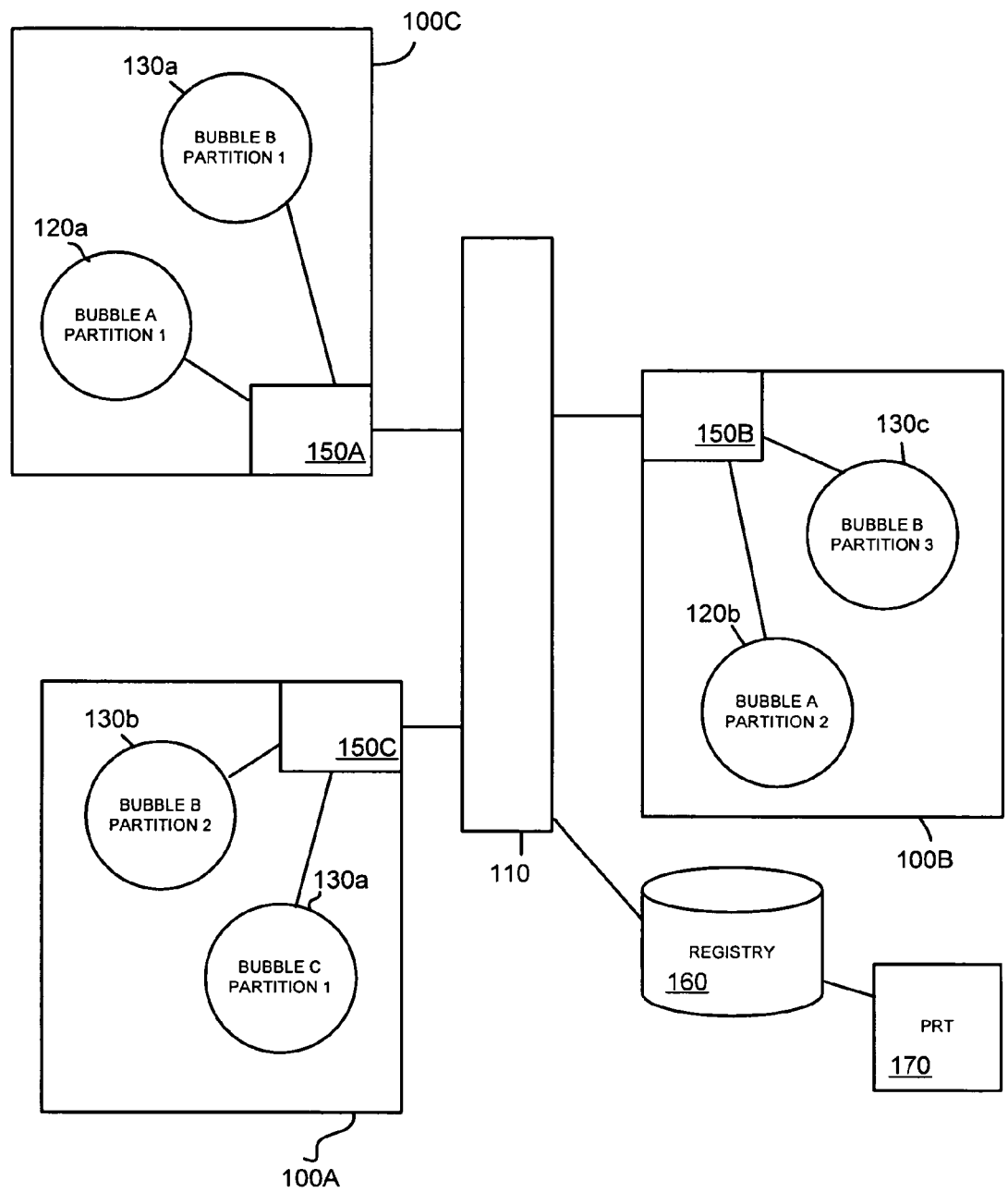
FIG. 1 is a schematic diagram illustrating a network architecture.

FIG. 1 is a schematic diagram illustrating such an architecture. In summary, in such architectures, network bubbles such as bubbles A, B, C and virtual backbone 110 are compartmentalized, geographically distributed network environments. Each bubble is made up of one or more bubble partitions 120a, 120b, 130a, 130b, 130c, 140a, each at a single physical location, and each with a physical connection to virtual network backbone 110 (itself a bubble), interconnecting the bubble partitions. In the schematic example of FIG. 1, Bubble A is shown as being made up of bubble partitions 120a and 120a on geographically separate campuses 100A and 100C; Bubble B is made up of bubble partitions 130a, 130b and 130c distributed across campuses 100A, 100B and 100C and bubble C is made up of bubble partition 130a on campus 100A only.

Each bubble has a boundary that separates it from all other bubbles. The boundary is implemented by network control points 150A, 150B, and 150C to which each bubble partition is connected. The network control points act as security policy enforcement points by filtering network traffic travelling into and out of the bubble partition, according to the source and destination IP addresses, for instance, in such a manner that a uniform security policy is implemented across each bubble. In the case of an IP network, bubble partitions are defined by address ranges corresponding to one or more devices. Alternatively, bubble partitions may be defined by the placement of a network access point, which allows the network security system to be used with wireless networks. Other factors can be applied to distinguish bubbles based on the underlying network technology used.

In this embodiment, hosts within a single bubble are assumed to be allowed full network access to each other, although other configurations are possible. Network access from one bubble instance to another bubble instance will always cross two bubble boundaries, and may or may not be allowed depending on the security policy of those two bubbles.

Hosts which are not members of a particular bubble may still access information resources on hosts within that bubble if the bubble boundaries permit such access.

It will be appreciated that implementation in the above-described partitioned architecture is presented for the purposes of example only and the invention as claimed may be implemented in other types of architectures.

One key advantage of the above architecture is that bubble types can be defined and standard security policies defined for the bubble types. Each bubble can then be identified as an instance of a bubble type. Each bubble instance can be initially implemented with a default access policy determined by its bubble type. Preferably, every possible IP address is assigned to a bubble instance and every bubble instance is ascribed to a bubble type, including the bubble type "unknown".

To illustrate the application of these concepts, several different, but useful, bubble types, which are intended to be composed of devices that have similar network connectivity requirements, similar application and host security concerns, will now be briefly described.

First, an office automation bubble type might be defined so that an enterprise may, for instance, implement one single worldwide instance of this bubble type that will be the default network environment for its workers.

The office automation bubble type might, for instance, require a high level of authentication at the bubble boundary for inbound access, but to make no assumptions about host security as would be appropriate for end user devices such as PCs, workstations, printers, PDAs, cell phones, etc. Inbound Access through a bubble boundary describes the packet flows in both directions which support a network connection or session between a host inside the bubble and a host outside the bubble which was initiated by the host outside the bubble.

"The Internet" is a bubble instance that contains all the IP address space not specifically assigned to any other bubble instance. Partitions of "The Internet" also connect to the virtual backbone 110 though network control points. Most partitions of "The Internet" bubble instance include the entire set of IP addresses which are included in "The Internet" bubble instance.

An "e-services" bubble type might require a more permissive bubble boundary for inbound access from anywhere on the Internet and require that all hosts and network devices conform to at least controlled host security standards. This could be the default environment for containing external facing web and Internet application servers, for instance. They may also usefully allow users in office automation bubble instance, for instance, to have greater application access than users on the Internet.

Whilst an enterprise may have only one, or at least a relatively small number of office automation bubble instances, it may need to implement many different "e-services" bubble instances to support a variety of Internet-facing applications and data stores with a high degree of compartmentalization.

Further bubble types might be defined as a default environment for internally used production application servers and many other data center systems, such as manufacturing lines, application development systems, etc.

Infrastructure bubble types may also be defined to support the IT infrastructure itself. Such "infrastructure" bubbles are different from other types in that infrastructure bubble instances may need to impose inbound and outbound bubble boundary access permissions (or restrictions) on bubble instances of other bubble types.

For example, a DNS bubble type might be defined to define the inbound and outbound access needed by the DNS bubble boundary, but also defines the inbound access needed by hosts within other bubble instances in order to allow the DNS service to operate correctly. A single instance of this bubble type might contain the authoritative DNS servers for a particular domain name space. Bubble instances of this type may also contain DHCP and NTP servers, for instance.

A further example of an infrastructure bubble might be a management and monitoring infrastructure bubble type that might be defined to contain the hosts that provide network and host monitoring, management, and operation applications and services for all the other bubble instances, including the virtual backbone.

The infrastructure comprises a bubble registry 160 which is a database containing a description of the enterprises network security policy, the network firewall rule configuration, and the business and operational processes associated with the administration of the network security policy. The contents of the registry are managed via a policy registration tool 170 the operation of which will be described in more detail below. It will be understood that the registry 160 and the policy registration tool 170 would be implemented within an appropriately secured bubble of the infrastructure even though this is not shown in FIG. 1.

To describe the network architecture the registry 160 may contain the following information, for instance:

For each bubble type: A unique bubble type identifier, a business language policy summary, a pointer to the approval document, name of the type owner, policy review period, date of last policy review, list of persons authorized to make changes to the bubble type in the registry, bubble boundary policy, host security policy, and pre-defined address space ranges reserved for bubble instances of this type (if applicable).

For each bubble instance: A unique bubble instance identifier, a pointer to the bubble type, a bubble instance manager (BIM), policy review period, date of last policy review, list of persons authorized to make changes to the bubble instance policy in the registry, a business language policy summary, a pointer to the approval document, business language description of instance specific network security policies, policy implementation specifications, business language description of instance specific host security policies.

For each bubble partition: A unique bubble partition identifier, a pointer to the bubble instance, a list of persons authorized to make changes to the bubble partition in the registry, IP subnet and mask, a list of boundary devices and interfaces which implement boundary security policy, detailed configuration sections for implementation of the boundary security policy (e.g. interface specific access lists.)

The registry 160 may have other functions, for instance it may also serve to report an error each time policy violations occur.

In the preferred embodiment, each bubble partition includes access lists describing inbound rules and outbound rules for hosts within it. The bubble registry distributes the network bubble boundary device access lists to the network control points. The distribution may be directly to the network control points, or it may be indirectly through a device management system or configuration management server, which in turn applies the specific structured access list to the device. The bubble registry also updates an audit log, which stores the network control point access list provided to each network control point and the time it was provided. The bubble registry can also generate a report for printing and viewing by a user. The report might be used to review and modify security policies, business projects, bubble types, network control points, and address ranges.

The bubble registry may periodically validate that the correct structured access list is in place on the specific network control point for which it is intended. Any discrepancies would be logged and an event would be created to take action. Either the administrator of the network security system is alerted or the bubble registry automatically distributes the correct structured access-list to the network control point. A mechanism is provided so that changes to any referenced element in a policy definition results in the automatic regeneration of the policy instances that reference the element that was changed. For instance, changes to the address tables, protocol tables, and structured access-list template, will cause the bubble registry to re-generate a specific structured access list for affected network control points.

The present embodiment includes a "role-based" model that assigns individuals with the authorized credentials the possibility to enforce what is permitted through the network boundary for an entire bubble instance—which may consist of partitions or subnets all around the infrastructure, in geographically and topologically dispersed locations. The only thing that these locations have in common is that they are part of the same bubble instance. The ability to map that entity into a single individual's control—through a role-based authorization model—allows the number of resources required to administer and operate security policy of a geographically distributed infrastructure to be reduced.

To facilitate this, a reusable policy template is used for each bubble type. It is defined by a set of rules to be applied at one or more policy enforcement points, that is the network control points in the architecture if FIG. 1, in a manner consistent with the policy definition. Without any abstraction, a rule specifies what the enforcement point allows or permits. In order to make the rule independent of the enforcement point, when writing rules, data specific to the enforcement point is abstracted by keywords, so that the policy template becomes independent of any real enforcement point. The bubble templates are expressed in a vendor neutral generic language that has been defined to describe rules in the registry.

A policy instance is then used as a specialization of a policy based on a policy template to define a bubble instance. A policy instance may customize a policy by defining additional rules and modifying one or more rules from the policy template. The policy instance is intended for a specific use. The original policy template is not affected by the changes in the instance definition. Like a policy template, the policy instance is independent of the enforcement points.

A policy deployment is the enforcement of a policy instance by defining a set of bubble partitions and applying the rules defined in the policy instance at one or more policy enforcement points for these partitions by generating device specific configuration fragments for each policy enforcement point within the instance. Keywords in rules are replaced by the data, such as IP address ranges, specific to each policy enforcement point and suitable access control lists are generated for the devices implementing the network control points.

Figure 2:
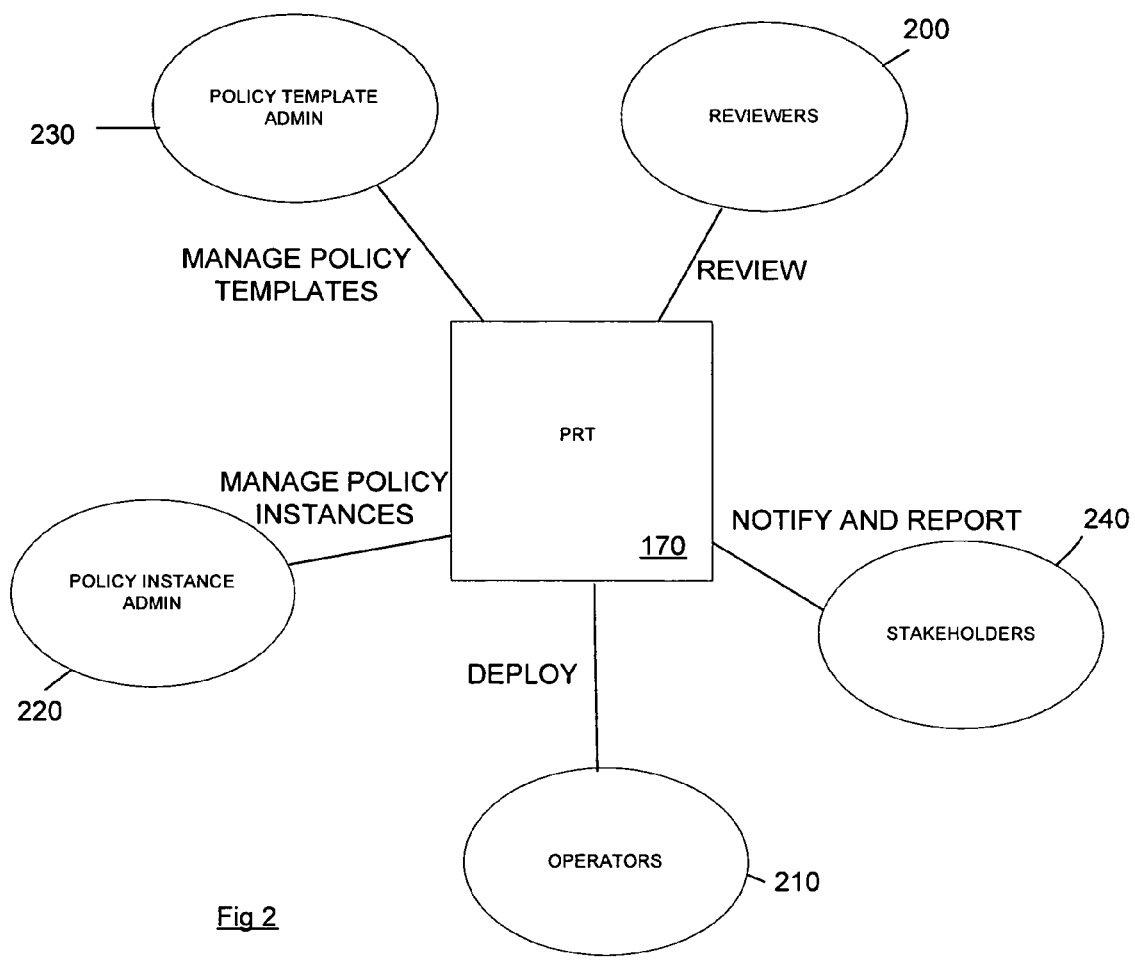
FIG. 2 is illustrates a policy registry tool and its users.

Roles are defined and enforced by the Policy Registration tool 170 to provide the appropriate level of ownership for each policy abstraction. The roles are illustrated in FIG. 2 and are defined as follows:

Reviewers 200: allowed to review, but not modify, all the data. Reviewers may be staff from the support team, or auditors needing to verify the content of the defined policies and whether they are applied on the correct enforcement points.

Operators 210: have all functions of the reviewers and are further allowed to define policy enforcement points, and to deploy and maintain policy instances to specific policy enforcement points. An operator might be responsible, for instance, for enforcing, ie applying a specified access list to a specified interface, the new version of a bubble boundary security policy in compliance with a defined response time. The operator user group is intended to include the people who have the detailed knowledge of the addresses and parameters of the policy enforcement points to enable then to deploy the policies directly without having to make any kind of risk assessment, nor requiring overall knowledge of the design of the system.

Policy instance administrators 220: have all functions of operators and are further allowed to modify policy instances. Note that, to avoid proliferation of policies, the instance administrators are not allowed to create policy instances. They can only modify them. The policy instance administrators may be a bubble instance manager (BIM), or their delegate. The BIM may be the person that has responsibility for all the business activities which are directly supported by the hosts and applications in the bubble instance. In general, the group of instance administrators is intended to comprise the individuals that are aware of the business needs for bubble instances, or technical needs in the case of infrastructure bubble instances.

Policy template administrators 230: have all the functions of instance administrators and are further allowed to create and modify policy templates and policy instances. The group of policy template administrator is intended to comprise the individuals that have the necessary technical skill and overall knowledge of the design of the computing system and the high level security policy objectives set by the enterprise, as well as the risks faced in order to correct specify the usage control models for the bubble types supported within the system.

Stakeholders 240 are individuals that receive notifications of and may be kept accountable for policy instances deployed by the operators.

Infrastructure administrator: this role is equivalent to a combination of instance administrator and operator.

These roles are enforced and controlled by a strict workflow process managed by the PRT 170 that provides operators with pre-configured and preapproved templates, and therefore reduces the number of steps to deploy policies.

Within the PRT 170 the policy creation environment (including templates and instances) and Policy deployment mechanism are separated.

Figure 3:
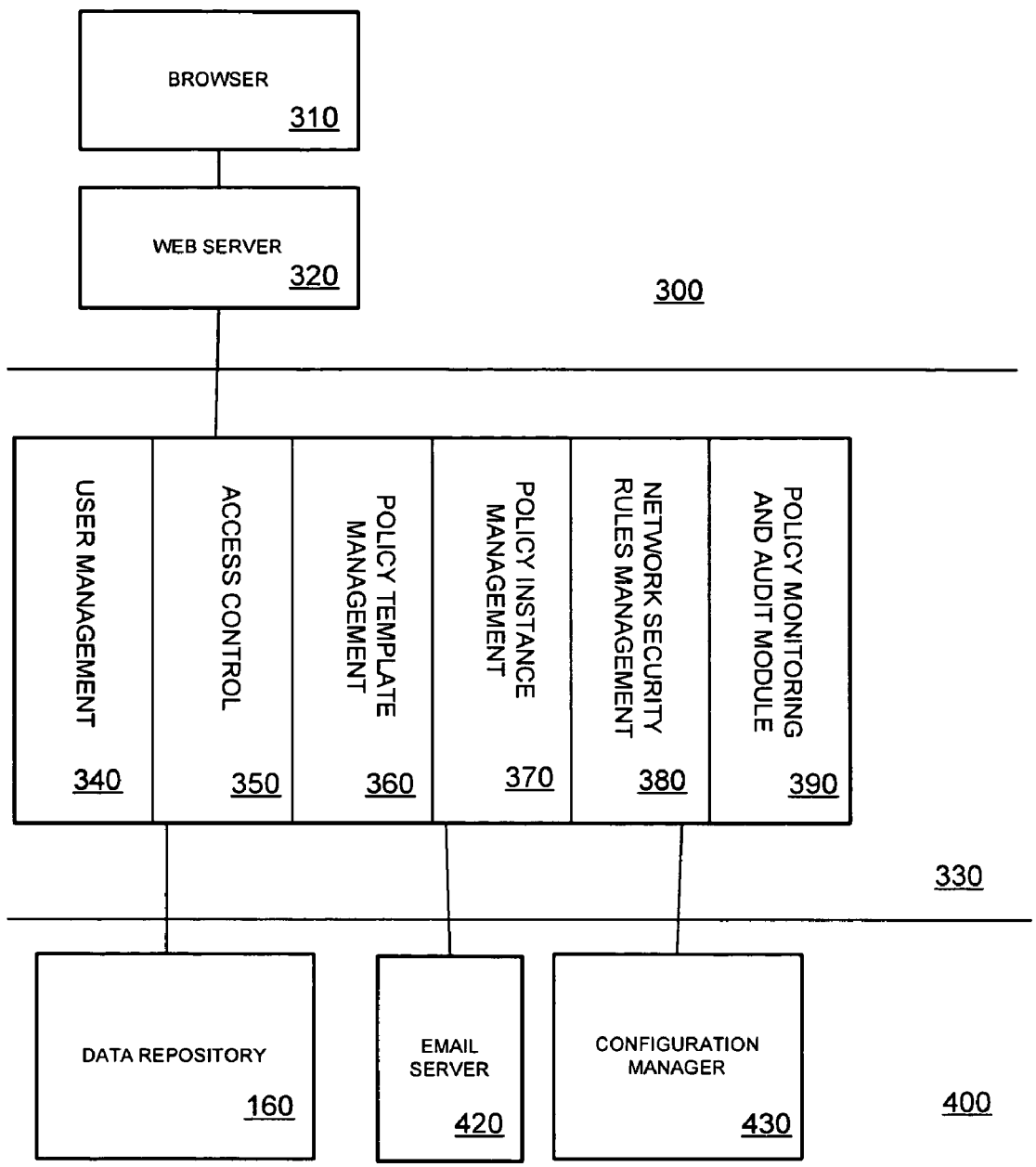
FIG. 3 is a schematic diagram illustrating the design of a policy registration tool.

FIG. 3 is a schematic diagram illustrating the design of PRT 170 in one embodiment of the invention. The tool comprises a front end tier comprising a web server 320 accessed via browser 310 using a secure SSL protocol. A middleware tier 330 includes the main logic of the application including user management module 340, access control module 350, policy template management module 360, policy instance management module 370, network security rules management module 380 and a policy monitoring and audit module 390. Finally, a backend tier 400 comprises data repository 160, an email (SMTP) server 420 and configuration manager 430.

User management module 340 performs creation and revocation of users, assignment of roles and privileges, modification of user data and management of user groups. Access control module 350 manages the user credentials for a current session and ensures that each user has the proper access to the features of the tool. Each user is assigned a unique login name and is assigned a session with a set of the privileges assigned to them. Template management module 360 performs creation, modification and workflow management with respect to the instance templates. Instance management module 370 performs the creation of policy instances from policy templates and deployments and modifications of policy instances, including by detecting changes and performing automatic regeneration of deployments based upon the modification of dependent network security rules. Network security rules management module 380 contains address tables and protocol tables defining keywords for groups of addresses and protocols defined by type and port number. Policy monitoring and unit reviews deployed policies at regular intervals by retrieving currently deployed configurations and looking for inconsistencies and creates and stores audit records.

Data repository 410 contains the audit information and all revisions of policy templates and policies. Configuration manager 430 applies the specific structured access list to the device. SMTP server is used to generate and send emails in order to distribute ACLs where configuration manager 430 cannot be used or to inform, for instance stakeholders of changes made to policy templates, policy instances or deployments.

In the preferred embodiment, the content of the policy templates is divided into four rule groups or sections, which are inbound local rule group, outbound local rule group, inbound remote rule group, and outbound remote rule group. The purpose of the rule groups is to allow the policies for the bubble to be completely specified and controlled across the network control points, and to ensure consistency in the implementation of the network security policy of the bubble in different network control points.

The inbound local rule group includes rules that enforce the access control on what data are allowed to enter the bubble partition. The outbound local rule group includes rules that enforce the access control on what data are allowed to exit the bubble partition. The inbound remote rule group includes rules that enforce inbound local rules on other bubble boundaries which import this access list template to ensure consistency in implementation of network security policies between bubbles. The outbound remote rule group includes rules that enforce outbound local rules on other bubble boundaries, which import this access list template to ensure consistency in implementation of network security policies between bubbles. Inbound and outbound remote rule groups are used by those infrastructure bubbles than need them.

Each rule group references an address table which defines keywords representing groups of addresses that can be placed together in a bubble instance, and a protocol table defining keywords representing protocols by type and port number. In the preferred embodiment both address groups and address supergroups are definable, where supergroups are collections of address groups, and protocol groups are also definable. The address protocol tables are created and maintained by the network security rules module 380.

From the rules contained in the policy templates templates, access control lists can be generated for deployment at each policy enforcement point.

Figure 4:
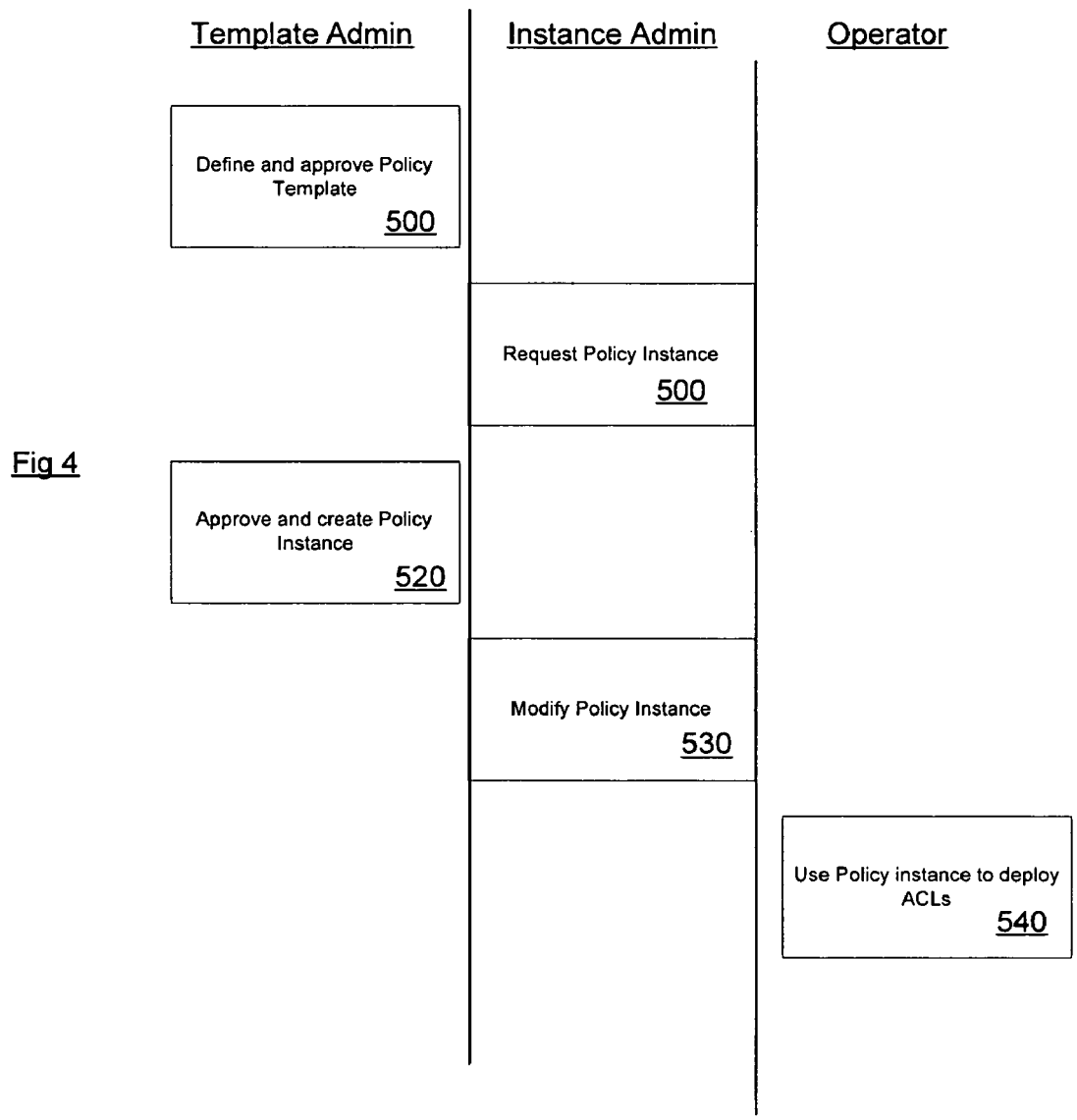
FIG. 4 is a flow chart illustrating an example of a process for deploying a bubble of a new type.

FIG. 4 illustrates an example of a process for deploying a bubble of a new type using the PRT tool. First, a new policy template is created for the new bubble type and all necessary approvals within the enterprise obtained, including the validation of its alignment with the IT governance model in place—step 500. Second, at a later time, someone within the enterprise may identify the potential need for a bubble of this type and request the creation of a policy instance—step 510. For reasons of control, the policy instance is created by the Template admin—step 520—but may be modified once created by the Instance Admin—step 530. The policy instance may then be deployed by an operator at step 540. It will be appreciated that creation of the Policy template in step 500 and approval and creation of the policy Instance in step 520 may both be relatively time consuming exercises depending of how the corresponding risk assessments are carried out and the organisation for the enterprise. However, both these steps may be carried out in advance of the need for an actual deployment. Once the need to an actual deployment arises, the deployment step 540 can then be carried out very rapidly.

All the operator would have to do is to know details about the Policy Enforcement Points (name, interface), the appropriate address space of the customer, and apply the appropriate policy instance for that deployment.

Similarly the redeployment of a modified policy instance, based on a modified policy template, can also be carried out very conveniently and rapidly.

By providing pre-approved templates to the operators, the number of steps a given operator would have to perform to deploy a policy is across distributed enforcement points. Much of the complexity of the task is delegated to the administrator of the template and to a lesser extent to the administrator of the instance.

The foregoing detailed description of the present invention is provided for the purposes of illustration and is not intended to be exhaustive or to limit the invention to the precise embodiment disclosed. Embodiments of the invention may provide different capabilities and benefits depending on the configuration used to implement the system. Accordingly, the scope of the present invention is defined by the following claims.

The invention claimed is:

1. A method for security policy management in a network comprising a plurality of hosts and at least one configurable policy enforcement point, comprising;
   creating one or more policy templates representing classes of usage control models within the network that are enforceable by configuration of the policy enforcement points;
   creating one or more policy instances, each based on a different one of the policy templates and instantiating the policy template for identified sets of hosts within the network to which the usage control model is to be applied,
   deploying the policy instances by generating and providing one or more configuration files for provisioning corresponding policy enforcement points within the network;
   controlling access to the policy templates and policy instances so that the policy templates are only modifiable by a first predeterminable user group, the policy instances are only modifiable by the first or a second predeterminable user group and the policy instances are only deployable by a third predeterminable user group.

2. A method as claimed in claim 1 wherein access to the policy templates is controlled such that policy instances can only be created by the first predeterminable group.

3. A method as claimed in claim 1 wherein the network is a partitioned network wherein a policy instance corresponds to one or more network partitions.

4. A method a claimed in claim 1 wherein at least some of the policy instances are deployed by configuring access control lists on router interfaces.

5. A method as claimed in claim 1 wherein at least some of the policy enforcement points are filters present in the network, wherein the filters comprise firewalls, routers, switches, or specific network appliances.

6. A method as claimed in claim 1 comprising detecting a change to one or more of the policy templates;
   automatically triggering the creation of one or more corresponding modified policy instances, and
   deploying the modified policy instances by generating and providing one or more modified configuration files for provisioning corresponding policy enforcement points within the network.

7. A tool for security policy management in a network comprising a plurality of hosts and at least one configurable policy enforcement point, the tool comprising;

a policy creation environment for enabling a first predeterminable user group to create one or more policy templates representing classes of usage control models within the network that are enforceable by configuration of the policy enforcement points and one or more policy instances, each based on one of the policy templates and instantiating the policy template for identified sets of hosts within the network to which the usage control model is to be applied, and for enabling a second predeterminable user group to modify the policy instances; and a deployment mechanism for enabling a third predeterminable user group to deploy the policy instances by generating and providing one or more configuration files for provisioning corresponding policy enforcement points within the network; and an access control mechanism for controlling access to the policy templates and policy instances so that the policy templates are only modifiable by the first predeterminable user group, the policy instances are only modifiable by the second predeterminable user group and the policy instances are only deployable by the third predeterminable user group.

8. A tool as claimed in claim 7 wherein the access control mechanism is arranged so that access to the policy templates is controlled such that policy instances can only be created by the first predeterminable group.

9. A tool as claimed in claim 7 wherein the deployment mechanism deploys at least some of the policy instances by generating access control lists for configuration on router interfaces.

10. A tool as claimed in claim 7 comprising a mechanism for, in response to a change to one or more of the policy templates, automatically triggering the creation of one or more corresponding modified policy instances, and the deployment of the modified policy instances by generating and providing one or more modified configuration files for provisioning corresponding policy enforcement points within the network.

11. A method for security policy management in a partitioned network comprising a plurality of hosts and at least one configurable policy enforcement point, comprising:

creating one or more policy templates representing classes of usage control models within the network that are enforceable by configuration of the policy enforcement points;

creating one or more policy instances, each based on one of the policy templates and instantiating the policy template for network partitions within the network to which the usage control model is to be applied, deploying the policy instances, including by generating and providing one or more configuration files for provisioning corresponding policy enforcement points within the network by configuring access control lists on router interfaces;

controlling access to the policy templates and policy instances so that the policy templates are only modifiable, and can only be created, by a first predeterminable user group, the policy instances are only modifiable by the first or a second predeterminable user group and the policy instances are only deployable by a third predeterminable user group.

12. A method as claimed in claim 11 comprising detecting a change to one or more of the policy templates;

automatically triggering the creation of one or more corresponding modified policy instances, and deploying the modified policy instances by generating and providing one or more modified configuration files for provisioning corresponding policy enforcement points within the network.

13. A tool for security policy management in a network comprising a plurality of hosts and at least one configurable policy enforcement point, the tool comprising:

a policy creation environment for enabling a first predeterminable user group to create one or more policy templates representing classes of usage control models within the network that are enforceable by configuration of the policy enforcement points and one or more policy instances, each based on one of the policy templates and instantiating the policy template for identified sets of hosts within the network to which the usage control model is to be applied, and for enabling a second predeterminable user group to modify the policy instances; and a deployment mechanism for enabling a third predeterminable user group to deploy the policy instances by generating and providing one or more configuration files for provisioning corresponding policy enforcement points within the network by generating access control lists for configuration on router interfaces; and an access control mechanism for controlling access to the policy templates and policy instances so that the policy templates are only modifiable and creatable by the first predeterminable user group, the policy instances are only modifiable by the second predeterminable user group and the policy instances are only deployable by the third predeterminable user group.

14. A tool as claimed in claim 13 comprising a mechanism for, in response to a change to one or more of the policy templates, automatically triggering the creation of one or more corresponding modified policy instances, and the deployment of the modified policy instances by generating and providing one or more modified configuration files for provisioning corresponding policy enforcement points within the network.

* * * * *